(12) United States Patent
Belzile

(10) Patent No.: US 9,180,613 B2
(45) Date of Patent: Nov. 10, 2015

(54) SIDE ACTUATED SHOOTING POT

(71) Applicant: Husky Injection Molding Systems Ltd., Bolton (CA)

(72) Inventor: Manon Danielle Belzile, Fairfield, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/403,180

(22) PCT Filed: Jun. 17, 2013

(86) PCT No.: PCT/US2013/046057
§ 371 (c)(1),
(2) Date: Nov. 23, 2014

(87) PCT Pub. No.: WO2013/192060
PCT Pub. Date: Dec. 27, 2013

(65) Prior Publication Data
US 2015/0110917 A1    Apr. 23, 2015

Related U.S. Application Data

(60) Provisional application No. 61/662,601, filed on Jun. 21, 2012.

(51) Int. Cl.
*B29C 45/18* (2006.01)
*B29C 45/02* (2006.01)
*B29C 45/53* (2006.01)
*B29L 31/00* (2006.01)

(52) U.S. Cl.
CPC ............... *B29C 45/02* (2013.01); *B29C 45/53* (2013.01); *B29C 45/531* (2013.01); *B29L 2031/772* (2013.01)

(58) Field of Classification Search
CPC .......................... B29C 45/02; B29C 45/2701
USPC ......................... 425/DIG. 5, 544, 572, 573
See application file for complete search history.

(56) References Cited

U.S. PATENT DOCUMENTS

| | | | |
|---|---|---|---|
| 5,192,555 A * | 3/1993 | Arnott | 425/544 |
| 5,260,012 A | 11/1993 | Arnott | |
| 5,543,092 A | 8/1996 | Ibar | |
| 6,152,721 A * | 11/2000 | Schad et al. | 425/150 |
| 6,276,914 B1 * | 8/2001 | Sicilia | 425/131.1 |
| 6,276,916 B1 * | 8/2001 | Schad et al. | 425/136 |
| 2008/0251974 A1 | 10/2008 | Simone | |
| 2009/0100962 A1 | 4/2009 | Uracz et al. | |
| 2010/0330225 A1 | 12/2010 | DiSimone | |

OTHER PUBLICATIONS

International Search Report, 3 pages.

* cited by examiner

*Primary Examiner* — Tim Heitbrink

(57) ABSTRACT

An injection molding system having a shooting pot assembly is disclosed. In one embodiment, the shooting pot assembly is in fluid communication with a mold and has an actuation direction that is substantially perpendicular to an injection axis of material injected into a mold cavity. In another embodiment, a shooting pot actuation system is a mounted on a side of a hot runner. In certain embodiments, the shooting pot actuation system includes a linear actuator operatively coupled with the shooting pot assembly to actuate the shooting pot assembly.

16 Claims, 7 Drawing Sheets

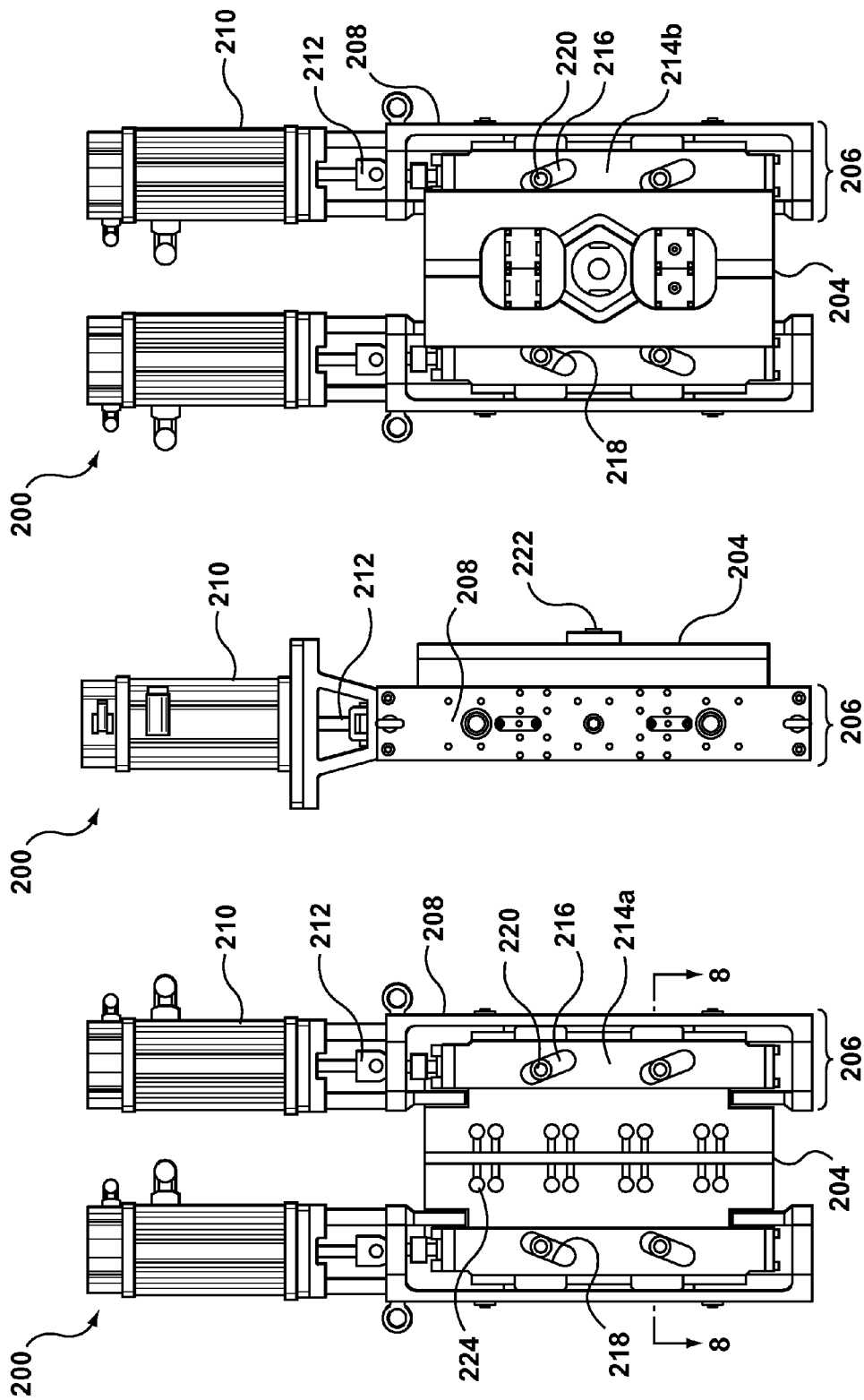

SIDE ACTUATED SHOOTING POT

BACKGROUND

Injection molding of plastics is a common technique used for manufacturing items ranging from plastic bottles to medical devices. To facilitate high-volume manufacturing, many injection molding machines incorporate a plurality of separate nozzles for delivering material to a plurality of molding cavities. In order to control the volume of material delivered to each mold cavity, and the pressure at which the material is injected, injection molding machines sometimes include shooting pots connected to either an individual or several molding cavities. In operation, a shooting pot receives a predetermined charge of material from a refill circuit and subsequently injects the material into an injection circuit at a predetermined pressure to fill the mold cavity(ies).

SUMMARY

The inventors have recognized that prior molding systems incorporating shooting pot assemblies with actuation directions aligned with an injection axis of a mold may be disadvantageous. For example, these arrangements may be exposed to elevated operating temperatures, cause an increase in system shut height, provide limited access for inspection and maintenance of shooting pot assemblies, and/or limit the available actuation force. In view of the above, the inventors recognized the benefits of providing one or more shooting pot assemblies that may be actuated in a direction substantially perpendicular to the injection axis of a mold. This arrangement may also permit the actuation system of the shooting pot assemblies to be located along an external side of a hot runner incorporated with the molding system, rather than in the conventional location on a face opposite the mold. Such an arrangement may reduce the system shut height, lower the operating temperature of actuation components, provide easy access and maintenance of the associated shooting pot assemblies, and/or provide increased shooting pot assembly actuation forces.

One illustrative embodiment is directed to an injection molding system including a hot runner adapted to inject material into a mold along a mold injection axis and a shooting pot assembly in fluid communication with the hot runner. An actuation direction of the shooting pot assembly is substantially perpendicular to the injection axis.

In another embodiment, an injection molding system is provided and includes a shooting pot assembly adapted to inject material into a mold along a mold injection axis, where an actuation direction of the shooting pot assembly is substantially perpendicular to the injection axis. The injection molding system further includes a shooting pot actuation system having a linear actuator operatively coupled with the shooting pot assembly. The linear actuator actuates the shooting pot assembly.

Another illustrative embodiment is directed to an injection molding system having a hot runner adapted to inject material into a mold, with the hot runner having a front surface arranged to face the mold, a rear surface opposite the front surface, and external sides. A shooting pot assembly is in fluid communication with the hot runner and a shooting pot actuation system is configured to actuate the shooting pot assembly. The shooting pot actuation system is disposed on at least one external side of the hot runner.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a schematic front view of a shooting pot actuation system mounted on a side of the hot runner;

FIG. 5 is a schematic side view of FIG. 4;

FIG. 6 is a schematic rear view of FIG. 4;

DETAILED DESCRIPTION

The inventors have recognized that shooting pot assemblies with actuation directions aligned with an injection axis of a mold generally are stacked in line with a hot runner and the mold and typically on a surface of the hot runner opposite the mold (i.e., between the hot runner and the platen of the injection molding machine). Such in-line stacked arrangement may lead to increased shut heights and the actuation components of the system may experience elevated operating temperatures due to exposure to adjacent hot components and heated mold plates. Furthermore, due to the position of the shooting pot assemblies stacked in line with the hot runner and mold, leakage from the shooting pot assemblies may collect on the hot runner and it may also be difficult to access and inspect the shooting pot assemblies and associated components without extensive disassembly of the system. In view of the above, the inventors have recognized the benefits of providing one or more shooting pot assemblies with actuation directions arranged substantially perpendicular to the injection axis of a mold. Orienting the shooting pot assemblies in such a manner may permit actuation systems of the shooting pot assemblies to be disposed on an external side of a hot runner rather than stacked in line with the hot runner and the mold. Such an arrangement may decrease the shut height since at least the shooting pot actuation system would no longer be positioned in line with the hot runner and mold. Furthermore, the actuation components may experience lower operating temperatures since they may be removed from the heated components and heated mold plates. Positioning the shooting pot actuation system on the side of the hot runner may also prevent leakage from the shooting pot assemblies onto the hot runner and improve accessibility for inspecting shooting components for leakage monitoring and maintenance without the necessity of disassembling the system.

Figure 1:
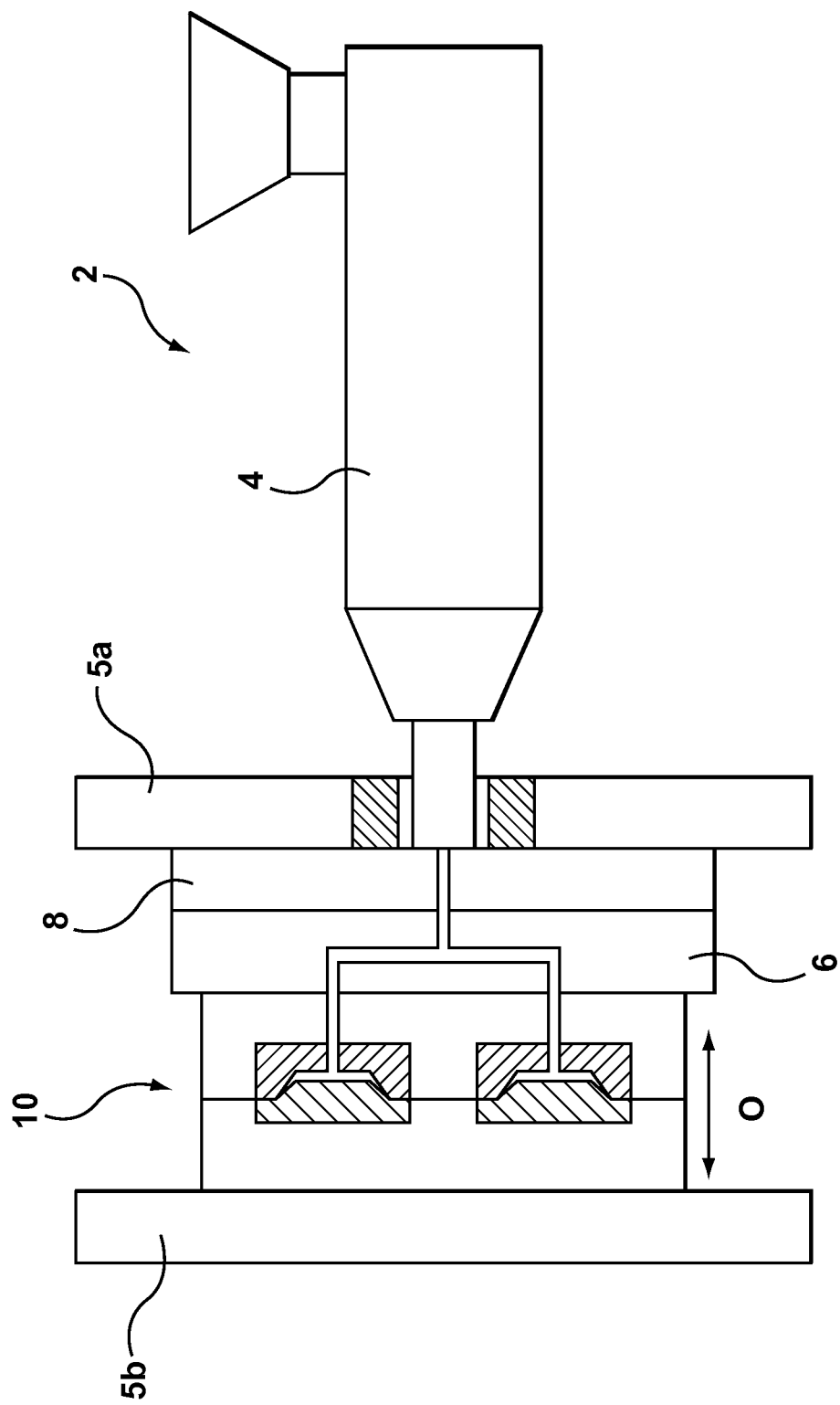
FIG. 1 is a schematic representation of an injection molding system with a prior art arrangement of in line shooting pot actuators for actuating shooting pot assemblies.

For the purpose of illustrating the relative positioning and orientations of the above noted systems, a prior art injection molding system 2 is depicted in FIG. 1. The prior art injection molding system 2 includes an injection feeder, such as screw/barrel system 4, platens 5a and 5b, a hot runner 6, a shooting pot actuation system 8, and a mold 10. As depicted in the figure, mold 10 has an opening direction O. In addition, as noted above, the prior art system has hot runner 6, shooting pot actuation system 8, and mold 10 stacked in line with one another. In this stacked orientation, shooting pot actuation system 8 is disposed on a side of hot runner 6 that is internal to the stacked assembly and oriented substantially perpendicular to opening direction O.

Figure 2:
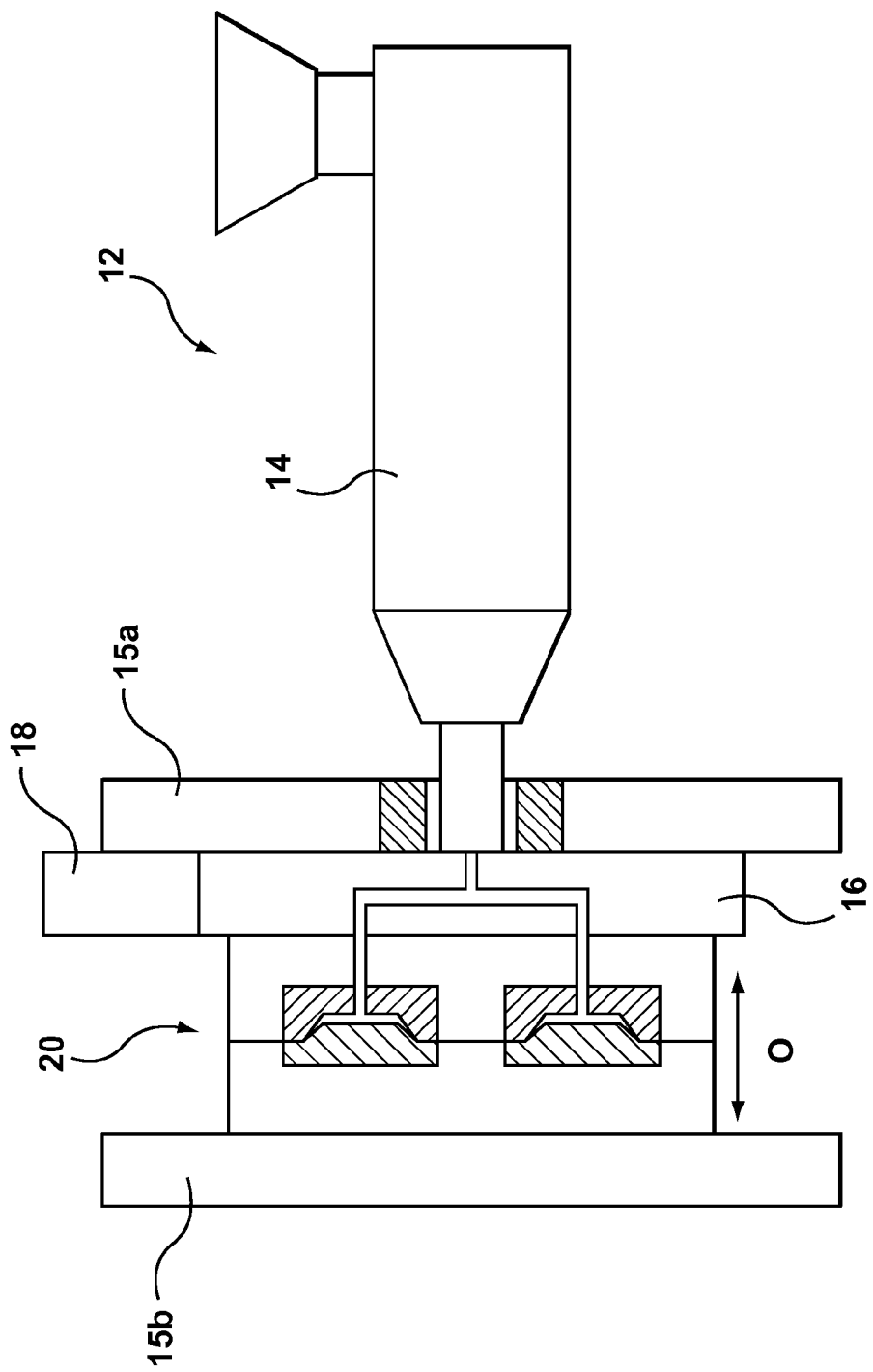
FIG. 2 is a schematic representation of an injection molding system with side actuated shooting pots.

In contrast, according to one embodiment of the present disclosure, as shown in FIG. 2, an injection molding system 12 includes an injection feeder 14, platens 15a and 15b, a hot runner 16, a shooting pot actuation system 18, and a mold 20. Similar to the above, the mold 20 has an opening direction O. However, as depicted in the figure, shooting pot actuation system 18 is not stacked with the other components of the injection molding system 12, that is, the shooting pot actuation system is located outside of the in-line stacked arrangement. Instead, shooting pot actuation system 18 is disposed on an external side of hot runner 16 that is oriented in a direction that is substantially parallel to the mold opening direction O. While the external side has been depicted as being substantially parallel to the opening direction O, it should be understood that the external side could be oriented at any appropriate angle and the current disclosure is not limited to a particular orientation. In addition, the depicted embodiment is a schematic representation of the system. Therefore, while the shooting pot actuation system 18 has been depicted as being located on a top external side of hot runner 16, the shooting pot actuation system 18 may be located on any external side of the hot runner 16 including, for example, a lateral external side of hot runner 16.

In one embodiment, an injection molding system includes a mold positioned in a mold press and an operatively coupled hot runner. The hot runner is adapted and configured to provide material to one or more shooting pot assemblies of the hot runner or other portion of the injection molding system. The one or more shooting pot assemblies are in selective fluid communication with one or more mold cavities of the mold as well as in fluid communication with conduits in the hot runner. For the sake of convenience, portions of the hot runner including conduits, any associated valves, and/or other components that are located upstream of the shooting pot itself may be referred to as the refill circuit. Similarly, for the sake of convenience, the portions of the hot runner including conduits, any associated valves and/or other components that are located downstream of the shooting pot itself may be referred to as the injection circuit. The one or more shooting pot assemblies inject desired charges of material at desired pressures into the mold cavities. Furthermore, each shooting pot assembly has an actuation direction substantially perpendicular to an injection axis of the mold. In addition to the actuation direction being substantially perpendicular to the injection axis of the mold, the actuation system(s) is/are disposed on a side of the hot runner at a location outside of the stacked assembly. While a direct connection has been described, in some embodiments, the shooting pot actuation system may be indirectly connected with or disposed on the side of the hot runner. For example, an intervening bracket, plate, or any other appropriate structure could be used to indirectly connect the shooting pot actuation system to the hot runner.

In one embodiment, the actuation system includes a linear actuator. The linear actuator may be oriented in any desired direction. In one embodiment the linear actuator is actuated in a direction that is substantially perpendicular to the actuation direction of the shooting pot assemblies and a camming interface transfers the actuation motion of the linear actuator to the shooting pot assemblies. This may result in a compact actuation system capable of actuating multiple shooting pot assemblies at once. In one nonlimiting example, such a system transfers a vertical actuation of the linear actuator into a horizontal movement of the shooting pot assemblies. While a camming interface has been disclosed, any number of arrangements of force transfer features such as gears, belts, and other appropriate power transfer mechanisms could also be used to transfer the movement of the linear actuator to the shooting pot assemblies. Furthermore, depending upon the operating environment the linear actuator may include either a pneumatic, a hydraulic, an electric drive, or any suitable combination thereof. Alternatively, the actuation force may be provided by a source internal to the injection molding system. For example, the injection and/or clamping motors could be coupled via a suitable coupling, such as a transmission, to the actuation system to provide the desired actuation force.

In one embodiment, the camming interface provides a mechanical advantage for actuating the shooting pot assemblies. The specific camming interface provided may be selected by balancing the considerations of a desired stroke length and a needed mechanical advantage to provide the desired actuation force for a given linear actuator. The provided mechanical advantage may be greater than, or less than one, as the current disclosure is not limited to any specific mechanical advantage. In some instances, the mechanical advantage may be used to provide relatively large injection pressures such as, for example, approximately 2000 bars to 4000 bars. However, regardless of the specific pressure, the injection pressure may be selected such that the mold cavity can be adequately filled. The injection pressure may be varied as a function of the provided force and mechanical advantage as well as the intensification ratio of the plungers which is related to the plunger area. For example, a 10 mm diameter plunger may require approximately 24 kN to generate 3000 bars of injection pressure. Therefore, if a 10 kN actuation force was supplied by an actuator, a mechanical advantage of 2.4 would be necessary to provide a desired 3000 bars of injection pressure, for example. By providing an appropriate mechanical advantage, it may be possible to use fast relatively low torque drives for the actuator such as DC brushless servo motors. Furthermore, if a constant mechanical advantage is desired, a linear camming motion may be used. If different mechanical advantages are desired during different portions of actuation, the camming interface may provide either a combination of different linear camming motions, or the camming interface may provide a nonlinear camming motion. For example, the slots may follow an arc, sequential linear segments with different relative orientations, an exponential curve, or any other desired camming actuation profile.

Turning now to the figures, one embodiment of the injection molding system will be described. While specific components and arrangements are depicted, the current disclosure is not limited in this fashion. Instead, the disclosure should be interpreted broadly as disclosing: 1) an injection molding system that may include one or more shooting pot assemblies with actuation directions arranged substantially perpendicular to an injection axis of a mold; and/or 2) shooting pot actuation systems arranged on an exterior side of a hot runner including but not limited to, for example, an external side of a hot runner that is substantially parallel to an opening direction of a mold. Such an arrangement may permit the use of a simple, and compact, linear actuation system for actuating the shooting pot assemblies.

Figure 3:
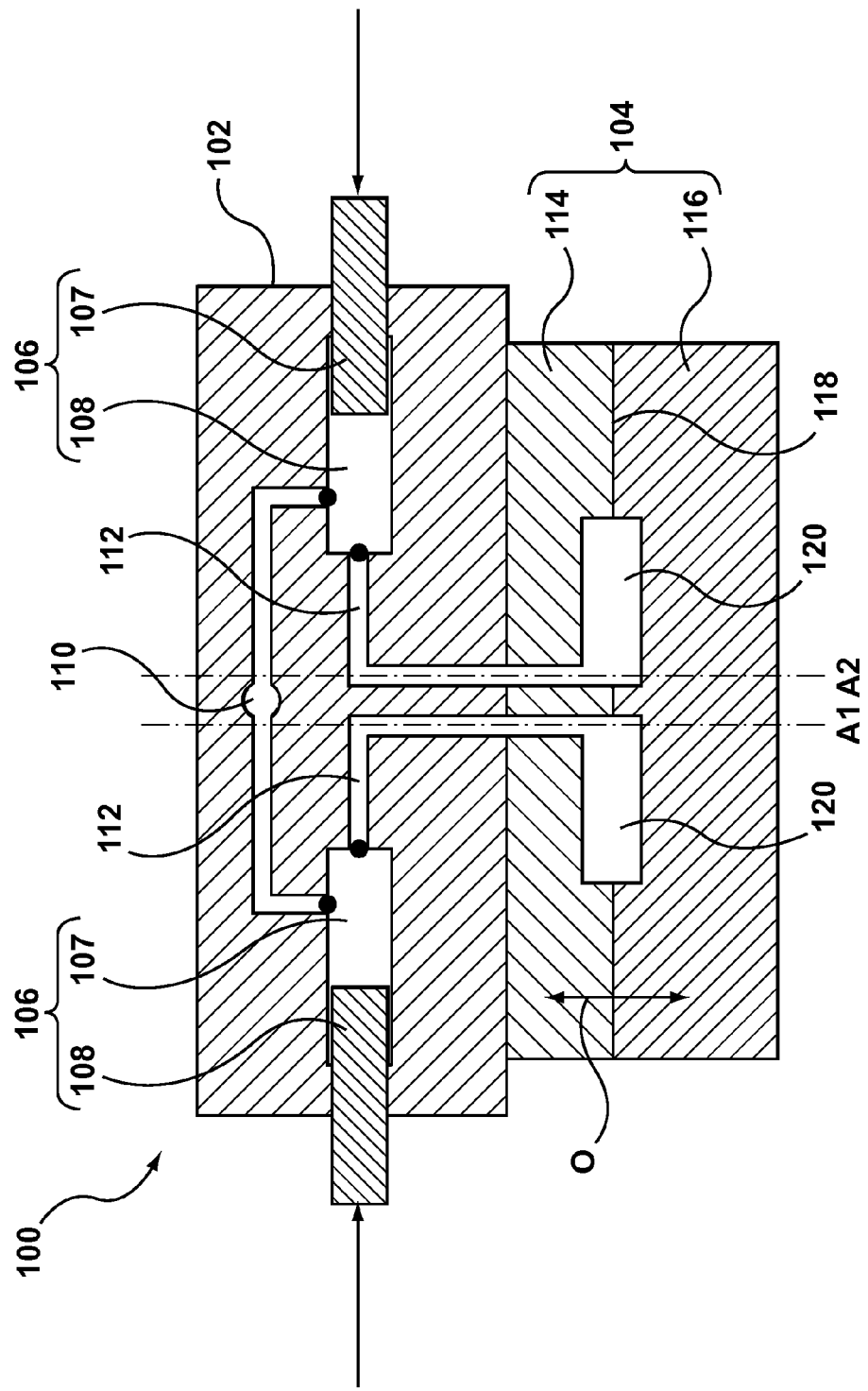
FIG. 3 is a schematic cross-sectional view of a portion of an injection molding system incorporating side actuated shooting pot assemblies.

One embodiment of an injection molding system 100 incorporating side actuated shooting pot assemblies with an actuation direction substantially perpendicular to the injection axis is depicted in the schematic representation of FIG. 3. The depicted injection molding system 100 includes a hot runner 102 and a mold 104, the specific hot runner nozzle arrangement used to inject melt into the mold cavity is not depicted in the figure. The hot runner 102 includes one or more shooting pot assemblies 106 disposed along one or more exterior sides of the hot runner that is outside of the mold/hot runner/platen stack. The shooting pot assemblies 106 include shooting pot cylinders 107 and plungers 108 arranged for reciprocating motion in the shooting pot cylinders. When actuated, the plunger can be retracted to allow pressurized melt from the refill circuit 110 to fill the shooting pot or inject material into an injection circuit 112. The injection circuits 112, and thus shooting pot assemblies 106, are in fluid communication with mold 104 via the hot runner nozzle. The mold 104 includes mold cavities 120 defined by separate mold halves 114 and 116. Therefore, when material is injected into the mold through injection circuit 112 due to actuation of the plungers, material is injected into mold cavities 120. The mold includes injection axes A1 and A2 oriented in a direction substantially corresponding to the direction of material flow into the mold cavities 120. As depicted in the figure, the actuation direction of the shooting pot assemblies 106, and the corresponding plungers 108, are substantially perpendicular to the injection axes A1 and A2 of the mold 104.

It should be appreciated that the shooting pot actuation described herein may also be used with systems where the injection axis is oriented differently than that described above. For example, in systems utilizing side gate hot runner injection nozzles, the injection axes into the mold cavity may be parallel to the parting line of the mold. In such an embodiment, then, the actuation direction of the shooting pot assemblies 106, and corresponding plungers 108, are substantially parallel to the injection axes into the mold 104, yet the shooting pot actuation system is mounted on a side of the hot runner outside of the stack assembly, as described herein.

FIGS. 4-6 depict one embodiment of an injection molding system 200 incorporating shooting pot actuation systems mounted on a side of the hot runner. The injection molding system includes a hot runner 204 with an inlet 222 in fluid communication with a refill circuit of an injection molding machine, not depicted. The refill circuit provides material to one or more shooting pot assemblies, not depicted, that are operatively coupled with the hot runner. The shooting pot assemblies are in fluid communication with outlets 224 of the hot runner. In the embodiment shown, the direction of flow through outlets 224 correspond substantially to an injection axis of a mold containing corresponding mold cavities, not depicted.

In the depicted embodiment, two separate shooting pot assemblies are operatively coupled with two separate shooting pot actuation systems 206 disposed on opposite exterior sides of the hot runner 204. While two separate actuation systems 206 are depicted in the figures components have only been labeled once in each figure for the purpose of clarity. The exterior sides upon which the actuation systems are disposed may be oriented substantially parallel to an opening direction of a mold, as was described above. Due to the arrangement of the shooting pot assemblies and the actuation system 206 on the exterior side of the hot runner 204, the shooting pot assemblies are actuated from the side by actuation system 206. More specifically, the actuation systems 206 are adapted to provide an actuation motion to the shooting pot assemblies in a direction that is substantially perpendicular to the injection axis of the mold, not depicted.

The actuation systems 206, operatively coupled with the shooting pot assemblies, include a frame 208 attached to the side of hot runner 204. A linear actuator 210 is attached to the frame and in some instances may extend out from the hot runner 204 as depicted in the figure. In the embodiment shown, the linear actuator 210 provides a linear actuation motion to a pair of camming members 214*a* and 214*b* via coupling 212. As depicted, the camming members 214*a* and 214*b* may extend along the external side of the hot runner 204. The camming members 214*a* and 214*b* of each actuation system 206 are arranged on opposing sides of an actuation member 216 though in some embodiments a single camming member may be used. As described in more detail below, actuation of the camming members 214*a* and 214*b* impart a motion to actuation member 216 via a camming interface to actuate the shooting pot assemblies for both refill and injection cycles of the shooting pot assemblies. In one embodiment, the camming members displace actuation member 216 in a direction that is substantially perpendicular to the injection axis of the mold. In addition, in some embodiments, the actuation member 216 is also displaced in a direction that is substantially perpendicular to the actuation direction of the linear actuator. It should be appreciated that the actuation member 216 is operatively coupled to the shooting pot plunger. While the actuation system 206 has been depicted as being directly attached to the hot runner 204, it should be understood that it is also contemplated that the actuation system may be indirectly connected to the hot runner 204, as would be apparent to one of ordinary skill in the art.

In some embodiments, the camming interface is located between the camming members and the actuation member. For example, the camming interface, as shown, includes slots 218 disposed along the length of camming members 214*a* and 214*b* and cam rollers 220 disposed along the length of actuation members 216. Each cam roller 220 interacts with the corresponding slot 218 to provide the desired camming motion. In the depicted embodiment, slots 218 have a linear profile. Depending upon the desired amount of mechanical advantage and the desired stroke length of linear actuator 210, slots 218 may be oriented at different angles relative to the actuation direction of the linear actuator 210. In other embodiments, the slots 218 follow a nonlinear profile to provide varying amounts of mechanical advantage during different portions of actuation. For example, the slots may follow an arc, sequential linear segments with different relative orientations, an exponential curve, or any other desired actuation profile. The above concept may be advantageous in circumstances such as at the end of an injection cycle where an increased injection pressure may be desired to ensure adequate mold packing. In other embodiments, the provided mechanical advantage may be selected to enable the use of fast high precision drives that output relatively low torques to improve the cycle time and control of the injection molding process.

Figure 7:
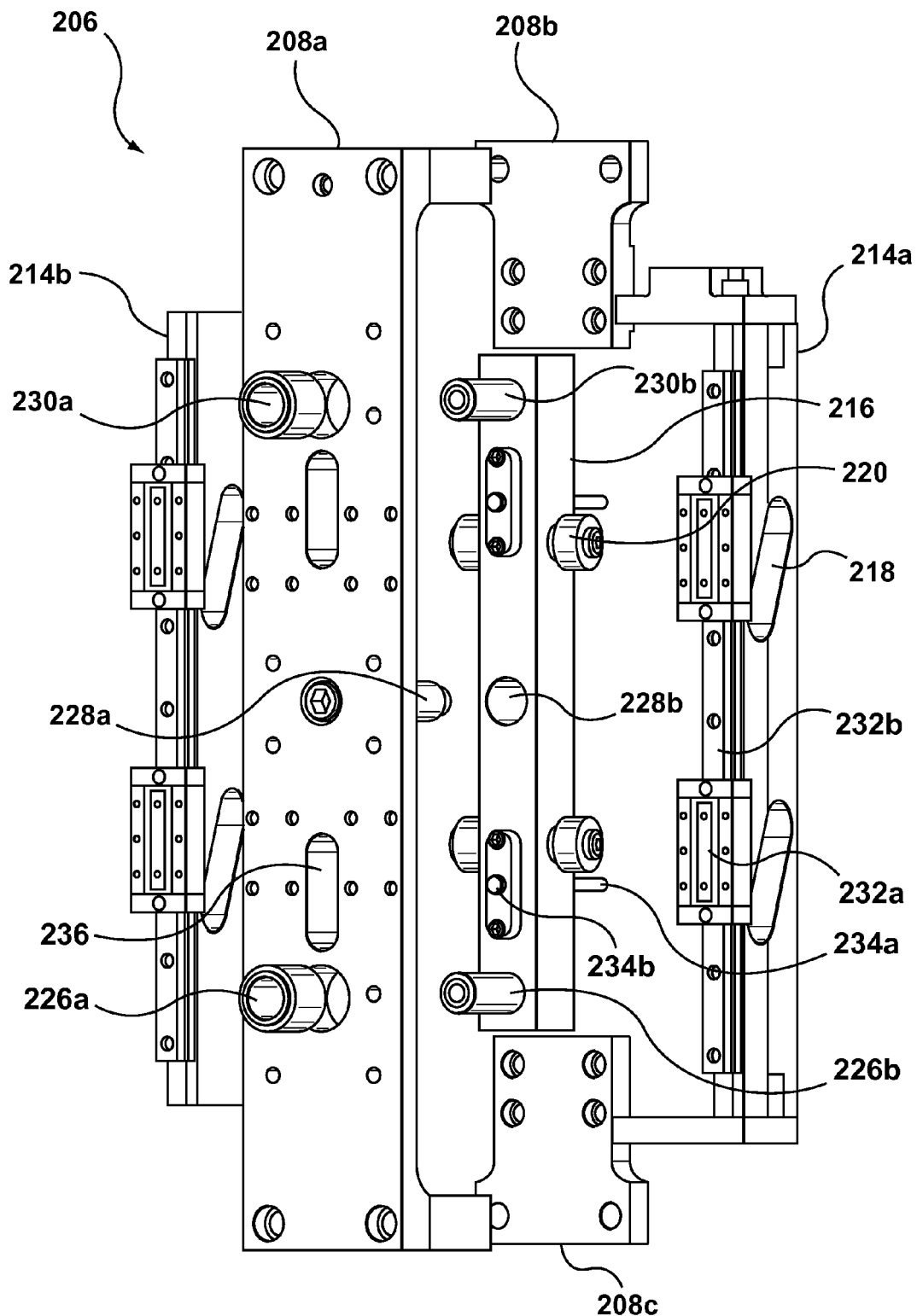
FIG. 7 is an exploded perspective view of the shooting pot actuation system.

FIG. 7 presents an exploded view of the shooting pot actuation system 206. To provide easy maintenance and access to components, the frame may include multiple portions such as selectively attachable frame pieces 8a-8c that may be removed and replaced through the use of removable fasteners such as, for example, bolts, pin connections, snap connections, or any other appropriate fasteners. As noted above, the actuation system 206 includes camming members 214a and 214b and an actuation member 216 disposed within the frame. As depicted in the figure, the camming and actuation members are camming and actuation plates, though any desired component configuration could be used. The frame 208 and actuation member 216 include corresponding linear bearings 226a-230b which are arranged and oriented to substantially limit undesired rotation or motion of the actuation member in any direction other than the actuation direction of the shooting pot assemblies. The motion of camming members 214a and 214b is also limited through the use of linear bearings. As depicted in the figure, linear bearings 232a and a rail 232b limit the motion of the camming members to a direction substantially parallel to a long axis of the frame. In the depicted embodiment, the direction of motion for camming members 214a and 214b is substantially perpendicular to the direction of motion of the actuation member 216. However, the camming members and operatively coupled linear actuator may be oriented in any desired direction.

In some embodiments, the actuation member may advantageously include one or more attached plungers 234 cooperating with the corresponding shooting pot cylinder. To permit simultaneous actuation of the shooting pot assemblies, the actuation member 216 and the attached plungers 234 are displaced in an actuation direction of the shooting pot assemblies, e.g., along the axis of the shooting pot plunger and/or shooting pot cylinder. When actuated, each plunger 234 displaces material within the corresponding shooting pot cylinder. Such an arrangement may advantageously permit the actuation of multiple shooting pot assemblies using a single actuation system, though multiple actuation systems may also be used.

In addition to the above, the plungers 234 may also include a plunger portion 234a and a plunger attachment portion 234b. Each plunger portion 234a is disposed within the cylinder of the corresponding shooting pot, and each plunger attachment portion 234b is removably attached to the actuation member 216. The plunger attachment portion 234b may be removably attached to the actuation member using any suitable fastening method including, for example, a bolted connection, a snap connection, a connection using interlocking features, or any other suitable fastening mechanism.

In some cases, it may be desirable to provide access holes 236 in the frame 208. Such an arrangement may advantageously provide easy access to the shooting pot assemblies (plungers and cylinders) for leakage monitoring, plunger inspection, plunger replacement, and/or general maintenance, without the need to disassemble the overall system or frame. To facilitate easy access, the access holes 236 are arranged and shaped to permit each plunger 234 to be accessed and removed from the actuation member 216 through the corresponding access hole 236 without needing to disassemble the frame 208. In the depicted embodiment, the plunger attachment portions 234a and corresponding access holes 236 have an elongated oval shape. However, as would be obvious to one of ordinary skill in the art any appropriate shape and arrangement of the plunger attachment portions and corresponding access holes could be used. Furthermore, the actuation member and frame may include any number of plungers and corresponding access holes as would be appropriate for the intended injection molding system.

Figure 8:
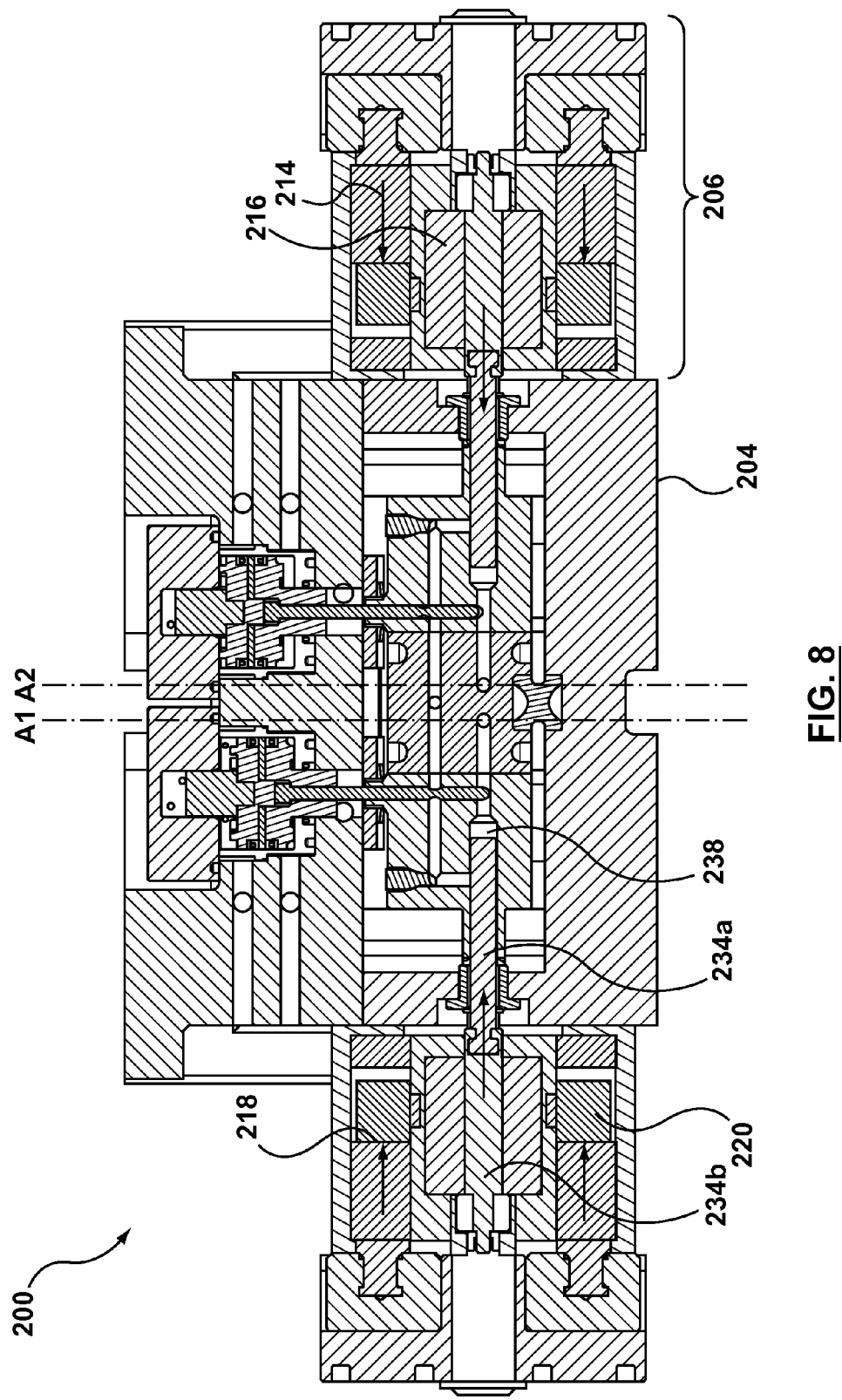
FIG. 8 is a schematic cross-sectional view of the shooting pot actuation system mounted on a side of the hot runner taken along line 8-8 of FIG. 4.

FIG. 8, taken along line 8-8 in FIG. 4, depicts a cross-section of the assembled camming interface and the shooting pot assemblies 238 during actuation. In the depicted embodiment, the camming interfaces include the interior surfaces of slots 218 and the cam rollers 220. As the camming members 214a and 214b are displaced, the interior surface of each slot 218 applies a force to the cam roller 220 disposed therein. The applied forces subsequently displace actuation member 216 to actuate the shooting pot plungers to inject melt into an injection circuit and to retract the plungers to allow pressurized melt from the refill circuit to fill the shooting pot. As depicted in the present embodiment, the actuation direction of the shooting pot assemblies 238 is substantially perpendicular to the injection axes A1 and A2 of a mold. For the sake of clarity, the mold is not shown.

In some embodiments, it may be desirable for the plunger portion 234a to be removably attached to the plunger attachment portion 234b. By permitting the portions to be removed from one another, plunger portion 234a, which may be subject to additional wear due to its exposure to the injection material, may be easily and quickly replaced with a new component without the need to replace the plunger attachment portion 234b as well. In one configuration, the attachment portion 234b passes through actuation member 216 and is removably attached to plunger portion 234a through the use of interlocking features. While a specific attachment arrangement has been depicted, the removable attachment between the plunger portion 234a and plunger attachment portion 234b may be accomplished in any number of ways as would be apparent to one of skill in the art including, for example, a threaded connection, a pin connection, or any other appropriate connection. In addition to the above, in some instances, it may be desirable to configure the connection as a sliding joint to allow for differential thermal growth between the actuation plate in the hot components and the manifold.

Figures 9, 10:
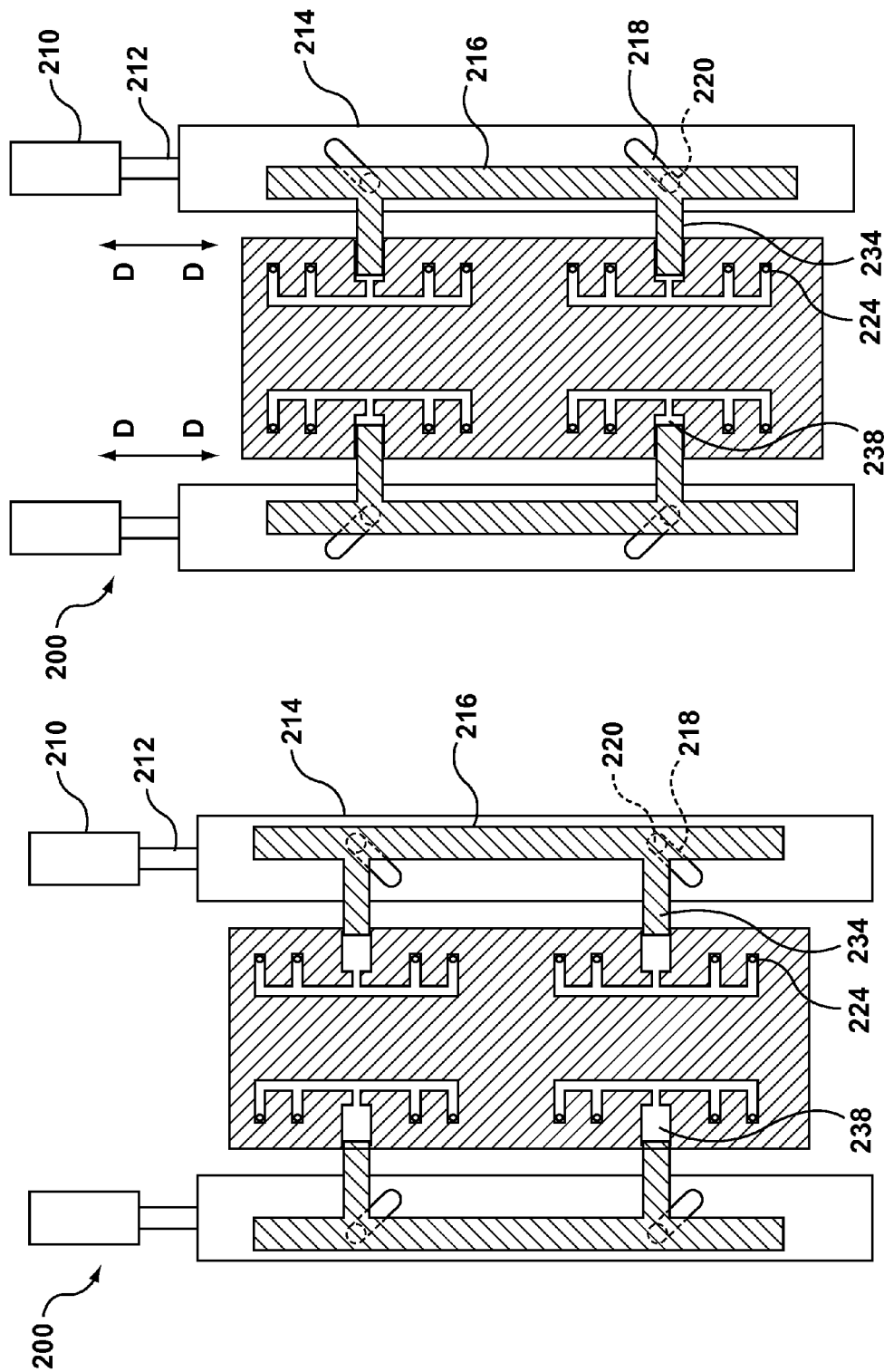
FIG. 9 is a schematic representation of a shooting pot actuation system positioned to fill the shooting pots.
FIG. 10 is a schematic representation of the shooting pot actuation system of FIG. 9 positioned to inject material out from the shooting pots.

Having described the various components of systems incorporating side actuated shooting pots and the operatively coupled actuation system, the operation of the system will be described in more detail with reference to FIGS. 9-10. FIG. 9 depicts the injection molding system in an unactuated position in which the shooting pot cylinders of the shooting pot assembly 238 are filled with a charge of material for injection into the operatively coupled mold cavities via outlets 224. When the linear actuator is actuated as depicted in FIG. 10, the actuating members 214 are linearly displaced along arrows D-D via coupling 212. Correspondingly, slots 218 incorporated in the actuating members 214 are also displaced. As slots 218 are displaced, cam rollers 220 operatively attached to the actuating member 216 cam along the oriented surfaces of slots 218. The interaction between the cam rollers 220 and the corresponding surfaces of slots 218 provide a force that actuates the actuating member 216 and the attached plungers 234. As the actuation member 216 is actuated, the operatively attached plungers are displaced into the shooting pot cylinders to inject the material charges into the one or more mold cavities in fluid communication with outlets 224. In addition to actuation of an injection cycle, the reverse actuation (from the configuration of FIG. 10 to FIG. 9) occurs to retract the plungers to allow pressurized melt from the refill circuit to fill the shooting pot in preparation for another injection cycle. In the depicted embodiment, the direction of actuation of actuation member 216 substantially corresponds to an actuation direction of the shooting pot assemblies 238. Furthermore, the actuation direction of actuation member 216 is substantially perpendicular to an actuation direction of the linear actuators 210. However, other orientations of the linear actuator are also envisioned.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An injection molding system, comprising:
   a hot runner adapted to inject material into a mold along a mold injection axis;
   a shooting pot assembly in fluid communication with the hot runner, wherein an actuation direction of the shooting pot assembly is substantially perpendicular to the injection axis; and
   a shooting pot actuation system operatively coupled with the shooting pot assembly, wherein the shooting pot actuation system is disposed on the external side of the hot runner and wherein the actuation system comprises a linear actuator that is actuated in a direction that is substantially perpendicular to the actuation direction of the shooting pot assembly.

2. The molding system of claim 1, wherein the external side is oriented substantially parallel to a mold opening direction.

3. The molding system of claim 1, further comprising a plurality of shooting pot assemblies.

4. The molding system of claim 1, wherein the actuation direction of the shooting pot assembly is substantially perpendicular to a mold opening direction.

5. The molding system of claim 1, wherein the actuation system comprises a frame attached to the side of the hot runner, the frame having an access hole arranged and adapted to provide access to the shooting pot assembly, wherein the shooting pot assembly comprises a plunger, wherein the plunger is selectively removable from the shooting pot assembly through the access hole.

6. An injection molding system, comprising:
   a shooting pot assembly adapted to inject material into a mold along a mold injection axis, wherein an actuation direction of the shooting pot assembly is substantially perpendicular to the injection axis; and
   a shooting pot actuation system having a linear actuator operatively coupled with the shooting pot assembly, wherein the linear actuator actuates the shooting pot assembly and wherein the linear actuator is actuated in a direction that is substantially perpendicular to the actuation direction of the shooting pot assembly.

7. The molding system of claim 6, wherein the actuation direction of the linear actuator is substantially perpendicular to the injection axis.

8. The molding system of claim 6, wherein the shooting pot actuation system further comprising a camming interface that transfers motion from the linear actuator to the shooting pot assembly.

9. The molding system of claim 8, wherein the camming interface comprises at least one of a linear and a nonlinear camming profile.

10. The molding system of claim 6, further comprising a camming member operatively coupled with the linear actuator and an actuation member operatively coupled with the shooting pot assembly, wherein the actuation member is displaced in the actuation direction of the shooting pot assembly when the camming member is displaced in an actuation direction of the linear actuator.

11. The molding system of claim 10, wherein the shooting pot assembly comprises a plunger operatively coupled with the actuation member, wherein actuation of the actuation member actuates the plunger.

12. The molding system of claim 10, wherein the actuation member is adapted to actuate a plurality of shooting pot assemblies.

13. The molding system of claim 6, further comprising a hot runner, wherein the shooting pot assembly is disposed on a side of the hot runner oriented substantially parallel to an opening direction of the hot runner.

14. An injection molding system, comprising:
   a hot runner adapted to inject material into a mold, the hot runner having a front surface arranged to face the mold, a rear surface opposite the front surface, and external sides;
   a shooting pot assembly in fluid communication with the hot runner; and
   a shooting pot actuation system configured to actuate the shooting pot assembly, wherein the shooting pot actuation system is disposed on at least one external side of the hot runner, and wherein the shooting pot actuation system comprises a linear actuator disposed on at least one external side of the hot runner and wherein the linear actuator actuates in a direction that is substantially perpendicular to the actuation direction of the shooting pot assembly.

15. The molding system of claim 14, wherein the hot runner is adapted to inject material into a mold along a mold injection axis, and wherein an actuation direction of the shooting pot assembly is substantially perpendicular to the injection axis.

16. An injection molding system, comprising:
   a shooting pot assembly adapted to inject material into a mold along a mold injection axis, wherein an actuation direction of the shooting pot assembly is substantially perpendicular to the injection axis; and
   a shooting pot actuation system having a linear actuator operatively coupled with the shooting pot assembly, wherein the linear actuator actuates the shooting pot assembly,
   wherein the shooting pot actuation system further comprises a camming interface that transfers motion from the linear actuator to the shooting pot assembly, and wherein the camming interface comprises a cam roller and a slot.

\* \* \* \* \*